Figure 1:
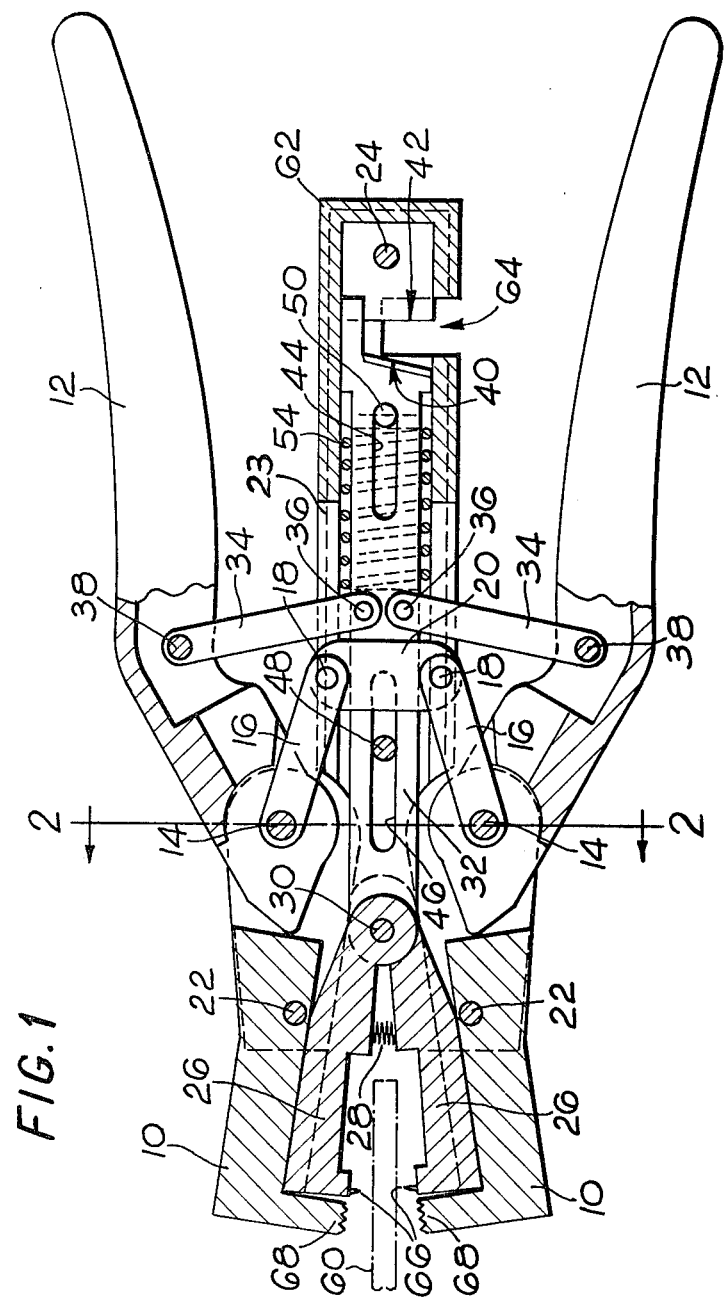

United States Patent [19]

Bieganski

[11] 4,329,891
[45] May 18, 1982

[54] WIRE STRIPPING TOOLS

[76] Inventor: Zdzislaw Bieganski, Timber La., Bedfordshire MK17 9PL, England

[21] Appl. No.: 190,855

[22] PCT Filed: Jul. 18, 1979

[86] PCT No.: PCT/GB79/00121
§ 371 Date: Mar. 27, 1980
§ 102(e) Date: Mar. 13, 1980

[87] PCT Pub. No.: WO80/00392
PCT Pub. Date: Mar. 6, 1980

[30] Foreign Application Priority Data
Jul. 27, 1978 [GB] United Kingdom ............... 31420/78

[51] Int. Cl.³ .............................................. H02G 1/12
[52] U.S. Cl. ................................................. 81/9.5 A
[58] Field of Search ............. 30/90.1; 81/9.5 R, 9.5 A

[56] References Cited

U.S. PATENT DOCUMENTS

| 1,151,319 | 8/1915 | Wood | 81/9.5 A |
| 3,146,645 | 9/1964 | Hindenburg et al. | 81/9.5 A |
| 4,112,791 | 9/1978 | Wiener | 81/9.5 A |
| 4,116,092 | 9/1978 | Wheeler | 81/9.5 A |

FOREIGN PATENT DOCUMENTS 1059064 6/1959 Fed. Rep. of Germany .... 81/9.5 A

Primary Examiner—James G. Smith
Attorney, Agent, or Firm—C. O. Marshall, Jr.

[57] ABSTRACT

A wire stripping tool is described in which the gripping jaw is pivoted mid-way along its length to a frame part and at one extreme end to a lever handle. The lever handle is connected to a drawbar by a pair of links so that in closing movement of the lever handle one of the links serves to aid jaw closing, and subsequently the second of the links displaces the drawbar so that a cutting jaw mounted inside the gripping jaw is displaced relative to the gripping jaw.

3 Claims, 2 Drawing Figures

WIRE STRIPPING TOOLS

This invention relates to wire stripping tools used for removing or displacing a portion of the sheath or covering from a wire core, for example in preparing an insulated electrical conductor for connection.

British Pat. No. 1,110,935 discloses a range of wire stripping tools comprising a pair of outer jaws for gripping the sheath or covering, a pair of inner jaws located between the outer jaws for cutting into the sheath or covering, and a pair of handles which can be closed together so as to first close both pairs of jaws and then displace the inner jaws relative to the outer jaws, so as to move the cut portion of the sheath along the core. As mentioned in said Patent, the cut into the sheath need not be completed in that the displacing movement can tear the sheath so as to achieve a like effect.

The problem with wire stripping tools of this kind is to produce simple design capable of economical manufacture and which can cope with a range of different cables and the like, which may differ from one another in terms of overall thickness, core thickness, and sheath hardness.

The object of the present invention is to provide an improved tool for these purposes.

In accordance with the invention, a wire stripping tool of the kind comprising a pair of outer jaws for gripping a cable, a pair of inner jaws for cutting the sheath of the cable, a lever handle for closing the jaws, and at least one link between the handle and a drawbar for displacing the inner jaws relative to the outer jaws, is characterised in that at least one outer jaw is pivoted between its ends to a common member, and at its end to the lever handle, a spring being provided to resist drawbar displacement, the geometry of the pivotal axes being such that handle closing movement causes jaw closing against spring pressure, and after a transition point the spring deflects to allow drawbar displacement.

FIG. 1 of the drawings is a part sectional elevation of a preferred embodiment of a wire stripping tool.

Figure 2:
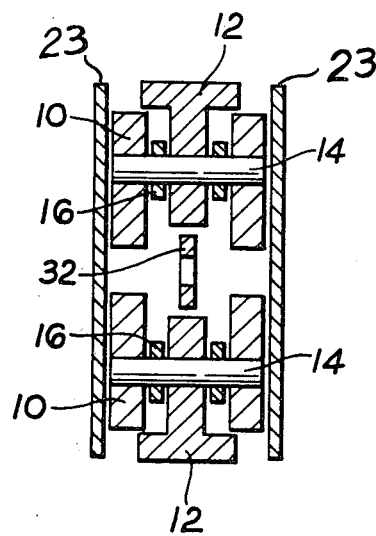

FIG. 2 is a section on the line 2—2 of FIG. 1.

The tool shown in the drawings comprises a pair of outer jaws 10 for gripping the sheath or covering of a cable, and a pair of lever handles 12. The handles are pivotally connected to the jaws by pins 14 which also serve to fulcrum first links 16, these links 16 being pivoted at their other ends upon pins 18 to a cursor 20.

The outer jaws 10 are also pivoted on pins 22 which pass through a pair of mounting plates 23 (the common member) which lie in parallel planes and extend from the vicinity of the pins 22 to surround pin 24.

A pair of cutting jaws 26 is located between the gripping jaws 10, and these jaws are spring-urged apart by a small compression spring 28, the cutting jaws being pivoted together on pin 30 which also couples the inner jaws 26 to a drawbar 32. The cursor 20 is a slide fit on the drawbar, and a second pair of links 34 is pivotally connected to the drawbar by pins 36, the outer ends of these links 34 being pivotally connected to the lever handles 12 by further pins 38.

The drawbar is formed at the end opposite to pin 30 with a cutting edge 40, and this is arranged to slide past the second cutting edge 42 formed on a cutter plate held in position by pin 24.

The drawbar is conveniently formed with a pair of elongated and co-axial slots 44, 46 and a limit pin 48, 50 extends through each of these and also through the said metal mounting plates. The pin 50 serves as an end abutment for a helically wound compression spring 54, the opposite end of which uses the second links 34 as an end abutment, so that this spring tends to drive the drawbar and hence the cutting jaws 26 to the illustrated position relative to the length of the gripping jaws 10. The pin 48, in addition to guiding the drawbar for linear displacement (as later described) also serves to provide a limit stop for movement of the cursor 20 towards the jaws.

In operation, the cable to be treated is placed between the jaws generally in the position indicated by the chain dot line 60 and then the levers 12 are closed towards one another. The initial movement of the lever handles 12 is to pivot them about the pins 38 so that the pins 14 separate, and take the pivotally coupled ends of the jaws 10 further apart, and because the jaws 10 are pivoted on the pins 22, this closes the gripping jaws upon the cable 60. At the same time and because the first and second links 16, 34 lie at an acute angle to one another, the pins 18 move the cursor towards the jaws until the movement is terminated either by the resistance of the cable 60 preventing the jaws being closed further or by the cursor 20 contacting the limit pin 48. As well as the jaws 10 gripping the cable sheath, the cutting jaws 26 penetrate into the sheath.

Subsequent closing movement of the lever handles towards one another is effected with pivoting of the handles about the pins 14 so that the shallow obtuse angle between the two links 34 reduces, and hence the drawbar 32 is displaced against the spring 54 and the cutting jaws 26 are moved relative to the gripping jaws 10 so as to pull the end portion of the sheath along the core of the cable so as to bare the core. At the end of the operation, when the handles are released, the spring 54 and also the spring 28 return the parts to the illustrated position so that the cable can be removed and a fresh one treated.

The end of the drawbar provided with the cutting edge 40 runs in a generally tubular housing 62, forming an extension of the mounting plates 23 and having a lateral slot 64, so that a wire can be cut to length before being stripped by being inserted in the slot 64 and the lever handles moved together so that the cutting edges 40, 42 move in scissor fashion to snip the cable.

In another embodiment of the invention (not illustrated) one of the jaws 10 is made integrally with the associated lever handle 12 and the corresponding links 16 and 34 are omitted. This unitary part may be made fast with the sleever 62, and the operation then is exactly the same as described, except that the total closing movement possible for the jaws is only half of what would be the case with the illustrated tool. Such a tool is therefore useful for a narrower range of cable sizes.

In either version, the range of sheath to core ratios which can be treated satisfactorily can be increased by providing a screw adjuster effective to displace one of the cutting jaws 26 relative to its gripping jaw 10 so that the projection of the cutting edge 66 relative to the gripping face 68 can be varied.

I claim:

1. A wire stripping tool comprising a pair of outer jaws (10) for gripping a cable, a pair of inner jaws (26) for cutting the sheath of the cable, a lever handle (12) for closing the jaws, a drawbar (32) for displacing the inner jaws relative to the outer jaws, and at least one link (34) connecting the lever handle to the drawbar for actuating the drawbar, at least one outer jaw being pivoted (on pin 22) to a common member (23), characterized in that the last mentioned outer jaw is also pivoted directly (on pin 14) to the lever handle, for closing of the outer jaws by the lever handle, and a spring (54) is arranged to act linearly against said drawbar to prevent premature displacement of the inner jaws relative to the outer jaws, a further link (16) being connected at one end to the pivotal connection between the jaw and the lever handle and at the other end to a cursor (20) arranged so that initial closing movement of the pivoted handle displaces the cursor toward the jaws and increases the distance of the pivotal connection of the lever handle and jaw from the drawbar.

2. A stripping tool as claimed in claim 1 characterised in that both outer jaws are pivotally connected to corresponding lever handles and both lever handles are pivotally connected to links connected to the drawbar.

3. A wire stripping tool as claimed in claim 1 wherein the drawbar is provided with a cutting edge arranged to be displaced beyond a second cutting edge in drawbar displacement.

* * * * *